United States Patent
Wang (10) Patent No.: US 11,043,009 B2
(45) Date of Patent: Jun. 22, 2021

(54) METHOD AND DEVICE FOR CALIBRATING DEPTH OF 3D CAMERA, AND COMPUTER DEVICE

(71) Applicant: TRIPLE WIN TECHNOLOGY(SHENZHEN) CO. LTD., Shenzhen (CN)

(72) Inventor: Yun-Wen Wang, New Taipei (TW)

(73) Assignee: TRIPLE WIN TECHNOLOGY(SHENZHEN) CO. LTD., Shenzhen (CN)

(*) Notice: Subject to any disclaimer, the term of this patent is extended or adjusted under 35 U.S.C. 154(b) by 41 days.

(21) Appl. No.: 16/681,966

(22) Filed: Nov. 13, 2019

(65) Prior Publication Data

US 2021/0065402 A1 Mar. 4, 2021

(30) Foreign Application Priority Data

Aug. 27, 2019 (CN) .......................... 201910795247.X (51) Int. Cl.
*G06K 9/00* (2006.01)
*G06T 7/80* (2017.01)

(52) U.S. Cl.
CPC ...... *G06T 7/85* (2017.01); *G06T 2207/10028* (2013.01)

(58) Field of Classification Search
None
See application file for complete search history.

(56) References Cited

U.S. PATENT DOCUMENTS

| 9,225,959 | B2 * | 12/2015 | Choi | G01S 17/08 |
|---|---|---|---|---|
| 2015/0062558 | A1 * | 3/2015 | Koppal | G01B 11/2527 |
| | | | | 356/5.01 |
| 2016/0104031 | A1 * | 4/2016 | Shotton | G06K 9/00201 |
| | | | | 382/154 |
| 2016/0182896 | A1 * | 6/2016 | Seo | G06T 7/593 |
| | | | | 348/46 |
| 2016/0309140 | A1 * | 10/2016 | Wang | H04N 5/378 |
| 2018/0176452 | A1 * | 6/2018 | Nikkanen | H04N 5/3696 |
| 2019/0147624 | A1 * | 5/2019 | Plank | H04N 5/2256 |
| | | | | 382/106 |
| 2019/0339369 | A1 * | 11/2019 | Fenton | G01S 7/497 |
| 2020/0326426 | A1 * | 10/2020 | Godbaz | G01S 17/894 |

FOREIGN PATENT DOCUMENTS

TW 201234261 A 8/2012

* cited by examiner

*Primary Examiner* — Shervin K Nakhjavan
(74) *Attorney, Agent, or Firm* — ScienBiziP, P.C.

(57) ABSTRACT

A method for calibrating a depth of a 3D camera includes selecting a calibration plane and obtaining a first depth image of the calibration plane using a 3D camera when a distance between the 3D camera and a calibration plane is a standard distance. A first depth image, represented by a first phase values of pixel points, is obtained. Then obtaining a second depth image of the calibration plane using the 3D camera when a distance is a testing distance, and intercepting the phase values of the pixel points of the two-dimensional image region and deleting the phase values of the pixel points of the non two-dimensional image region in the second depth image. Calculating and outputting predicted phase values of pixel points in the non two-dimensional image region of the second depth image and calibrating the second depth image.

10 Claims, 6 Drawing Sheets

METHOD AND DEVICE FOR CALIBRATING DEPTH OF 3D CAMERA, AND COMPUTER DEVICE

FIELD

The subject matter herein generally relates to 3D camera calibration, in particularly, to a method for calibrating depth of 3D camera, a device for calibrating a 3D camera depth, and a computer device.

BACKGROUND 3D (three dimensional) camera can detect the depth of field in shooting space. With the development of machine vision, autopilot and other technologies, there are more and more applications in object recognition, behavior recognition, and scene modeling using 3D camera. The distance between the object and the camera is obtained by measuring the optical flight time of the 3D camera, specifically, a laser pulse is continuously emitted to the object by the 3D camera, and then the reflected light is received by the sensor, and the exact distance of the target is obtained by detecting the round-trip time of the laser pulse. However, because speed of laser is very fast, it is difficult to realize a short distance between the object and the 3D camera by any direct measurement. Therefore, the object observed can be determined by measuring the phase difference between emitted and reflected light. The existing 3D camera has to calibrate its depth before leaving factory. The existing method to judge the 3D camera accuracy is comparing the captured phase value of pixel points with theoretical phase value in different known distances.

Obviously there must be limitation of the size of the image to be measured, when the testing distance exceeds the standard distance, the information of the test picture will contain non-two-dimensional information, such as the ceiling, ground, and adjacent walls (for example) information other than objects in the testing picture. Since the obtained image information contains non-two-dimensional information, the depth information obtained by the 3D camera is inaccurate and precise calibration is difficult to achieve.

Therefore, there is room for improvement within the art.

BRIEF DESCRIPTION OF THE DRAWINGS

Implementations of the present technology will now be described, by way of embodiments only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

Figure 1:
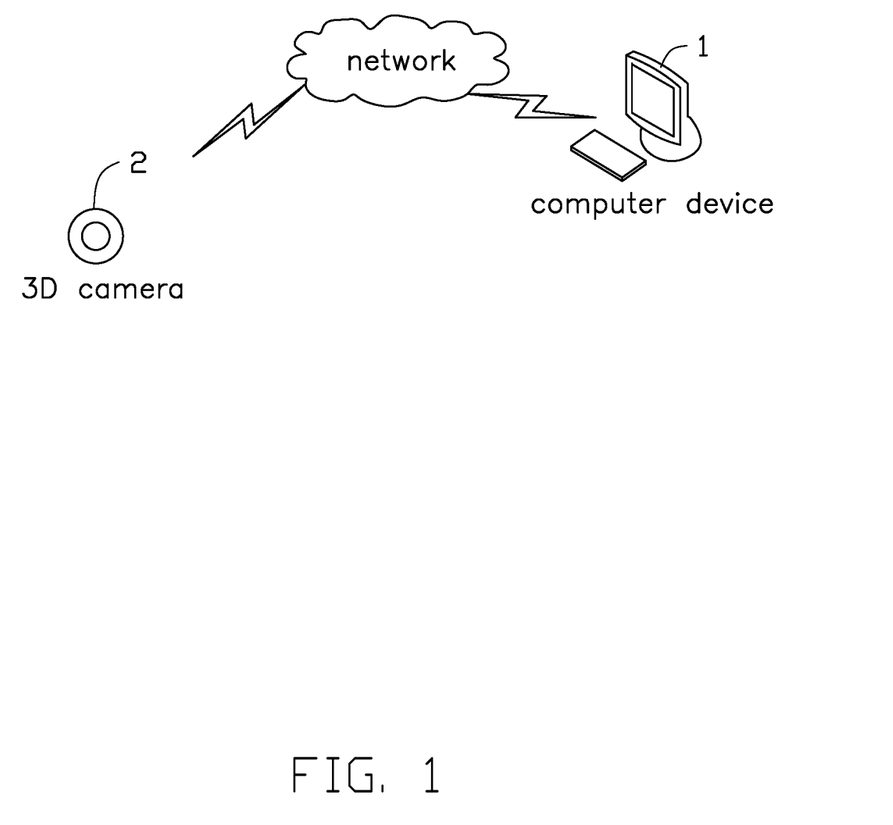
FIG. 1 is a schematic diagram of the application environment architecture of a method for calibrating a depth of a three-dimensional camera in accordance with one embodiment.

FIG. 1 is a schematic diagram of the application environment architecture of a method for calibrating a depth of a three-dimensional camera in accordance with one embodiment.

A method for calibrating depth information of a 3D camera is disclosed and the method can be applied in a computer device 1. The computer device 1 and the 3D camera 2 establish a communication connection through a network, as shown in FIG. 1. The network can be wired or wireless, e.g. radio, WI-FI, cellular, satellite, broadcast, etc.

The computer device 1 may be an electronic device having software that calibrates the depth information of a 3D camera, such as a personal computer, or a server, etc., and the server may be a single server, a server cluster, or a cloud server, etc.

The 3D camera 2 is used to obtain 2D image information and depth information of an image.

Figure 2:
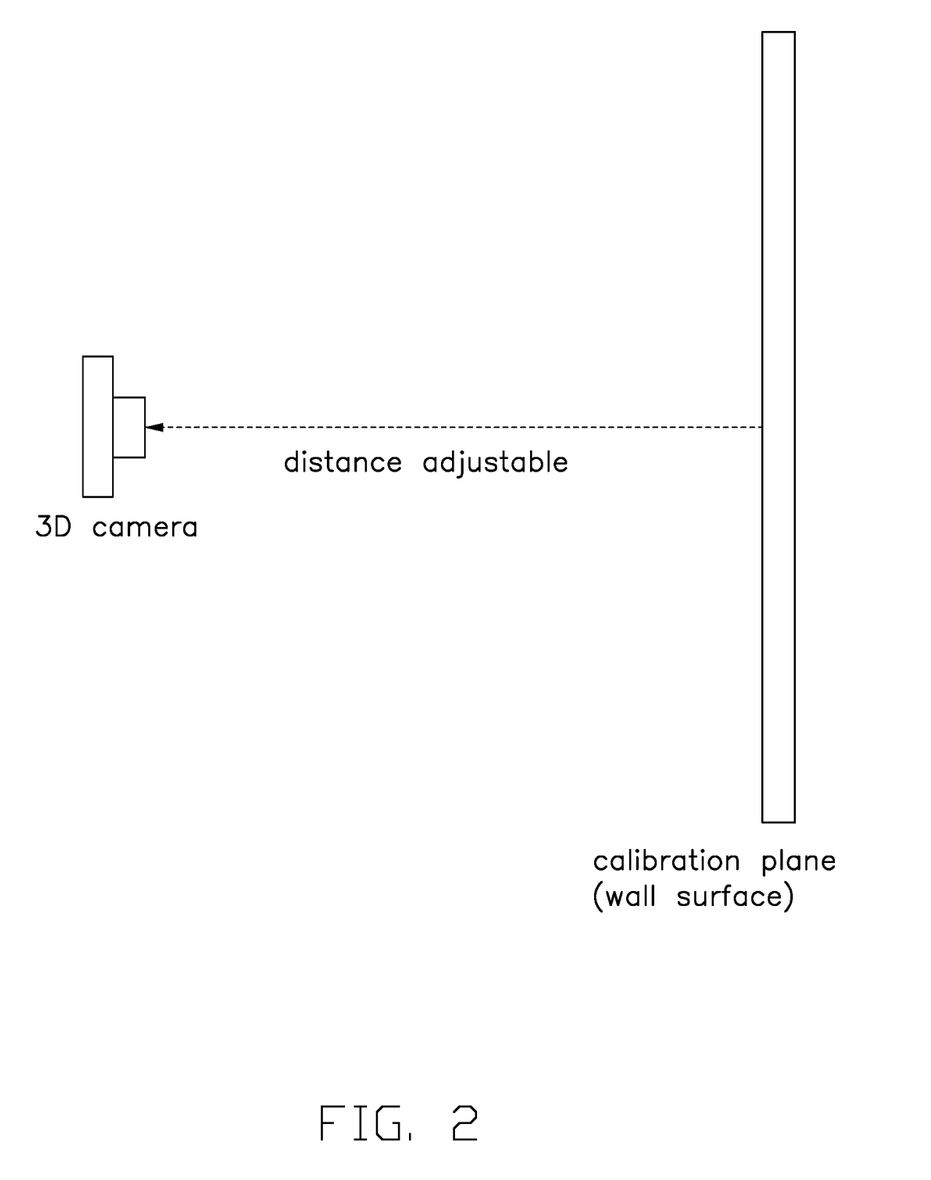
FIG. 2 is an application scene diagram of a method for calibrating a depth of a three-dimensional camera in accordance with one embodiment.

Referring to FIG. 2, an application scenario diagram of a method for calibrating a depth information of a 3D camera is provided. In the schematic diagram, surface of a wall is used as a calibration plane. The wall surface is a plane with consistent material, and a distance between the 3D camera and the wall surface is a testing distance. The testing distance can be adjusted in a preset range. The 3D camera 2 is used to take picture of a wall surface and generate a depth image, and the depth image is used to calibrate an accuracy of the 3D camera 2.

Figure 3:
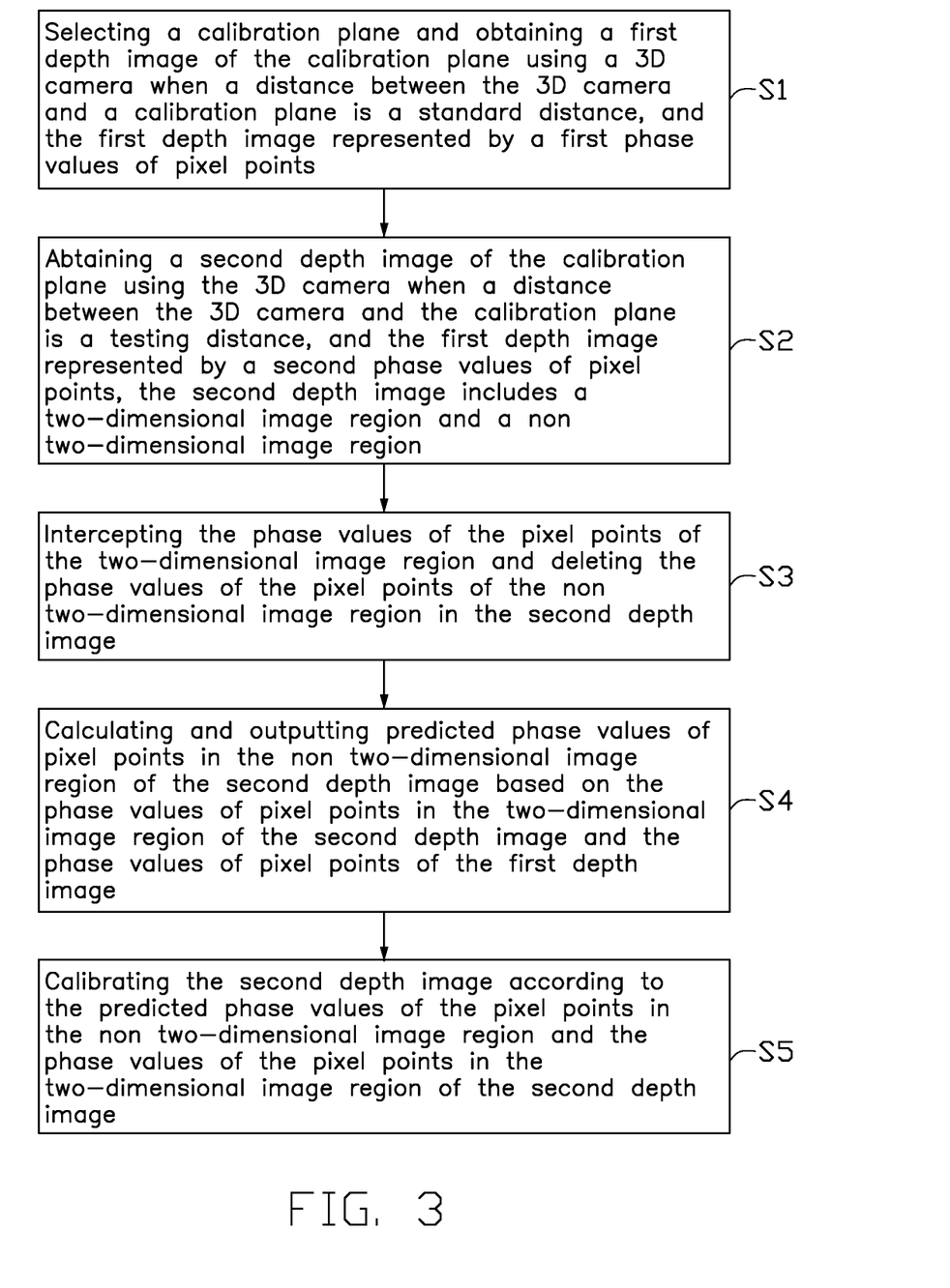
FIG. 3 is a flow chart of a method for calibrating a depth of a three-dimensional camera in accordance with one embodiment.

Referring to FIG. 3, a flowchart of a method for calibrating a depth information of a 3D camera is provided in a second embodiment. The order of Blocks in the flowchart may be changed according to different needs and some Blocks may be omitted.

In Block S1, when a distance between the 3D camera 2 and the calibration plane is defined as a standard distance, a first phase value of each pixel point is acquired, and a first depth image represented by the first phase values is obtained. The standard distance of different 3D cameras will be different, and the standard distance is related to characteristics of a 3D camera itself.

The calibration plane is an even plane forming by uniform material or an uniform reflectivity. The standard distance is a distance between the 3D camera 2 and the calibration plane. The standard distance is less than a testing distance. When a distance between the 3D camera 2 and the calibration plane is a standard distance, images acquired by the 3D camera 2 include only a two-dimensional image region, and do not include a non two-dimensional image region. The non two-dimensional image region refers to a wall surface intersecting with the calibration plane, or intersection with a ceiling or a floor and the like adjacent to the standard plane.

As shown in the below Table 1, the 3D camera 2 acquires phase values of partial pixel points of a first depth image when a distance between the 3D camera 2 and a calibration plane is 0.6 m, and the values in the Table 1 is the phase values of partial pixel points of the first depth image.

TABLE 1

| 774 | 769 | 743 | 741 | 734 | 675 | 727 | 736 | 741 | 802 | 811 |
| 767 | 759 | 737 | 733 | 728 | 672 | 724 | 729 | 733 | 796 | 803 |
| 683 | 679 | 657 | 658 | 652 | 617 | 657 | 666 | 667 | 715 | 720 |
| 680 | 675 | 654 | 651 | 651 | 616 | 655 | 659 | 663 | 710 | 716 |
| 675 | 670 | 653 | 648 | 649 | 612 | 654 | 657 | 659 | 711 | 715 |
| 655 | 652 | 635 | 635 | 630 | 592 | 637 | 642 | 644 | 691 | 695 |
| 664 | 658 | 641 | 635 | 633 | 593 | 643 | 644 | 651 | 706 | 713 |
| 668 | 659 | 643 | 638 | 634 | 596 | 643 | 646 | 649 | 710 | 716 |
| 668 | 664 | 644 | 638 | 636 | 596 | 642 | 650 | 651 | 714 | 721 |
| 711 | 701 | 679 | 679 | 673 | 617 | 676 | 679 | 684 | 753 | 764 |
| 713 | 706 | 684 | 688 | 675 | 619 | 676 | 682 | 633 | 758 | 766 |

In Block S2, a second phase value of each pixel point is obtained when a distance between the 3D camera and the calibration plane is a testing distance, and the obtaining of a second depth image is represented by the second phase values. The second depth image includes a two-dimensional image region and a non two-dimensional image region.

The testing distance refers to a distance between the 3D camera 2 and the calibration plane. In one embodiment, the testing distance may be adjusted to be any distance between 0.6 m and 3.5 m according to the shooting distance to be calibrated by the 3D camera 2. For one calibration plane, when a testing distance exceeds a standard distance, the second depth image contains a two-dimensional image region of the calibration plane and the wall, ceiling, ground, and other non two-dimensional image regions adjacent to the calibration plane.

In one embodiment, the testing distance to be calibrated by the 3D camera 2 is 1.2 meters. When the testing distance is 1.2 meters, the second depth image contains a two-dimensional image region of the calibration plane and a non two-dimensional image region about a wall, ceiling, ground, and the like adjacent to the calibration plane. The 3D camera 2 obtains the phase value of each pixel in the second depth image when a testing distance from the calibration plane to the 3D camera 2 is 1.2 meters, as shown in Table 2.

TABLE 2

| 1530 | 1523 | 1468 | 1472 | 1439 | 1309 | 1436 | 1447 | 1453 | 1568 | 1582 |
| 1519 | 1506 | 1456 | 1452 | 1425 | 1300 | 1428 | 1425 | 1449 | 1557 | 1562 |
| 1390 | 1384 | 1337 | 1336 | 1324 | 1233 | 1326 | 1333 | 1339 | 1429 | 1485 |
| 1384 | 1371 | 1334 | 1323 | 1328 | 1228 | 1320 | 1329 | 1338 | 1416 | 1420 |
| 1378 | 1360 | 1328 | 1321 | 1315 | 1223 | 1318 | 1322 | 1333 | 1418 | 1428 |
| 1346 | 1338 | 1307 | 1301 | 1292 | 1194 | 1293 | 1300 | 1307 | 1385 | 1401 |
| 1379 | 1352 | 1326 | 1317 | 1310 | 1211 | 1313 | 1315 | 1325 | 1420 | 1431 |
| 1352 | 1323 | 1326 | 1318 | 1313 | 1214 | 1315 | 1320 | 1328 | 1427 | 1432 |
| 1385 | 1378 | 1327 | 1320 | 1317 | 1221 | 1317 | 1325 | 1333 | 1435 | 1448 |
| 1452 | 1437 | 1402 | 1386 | 1381 | 1269 | 1379 | 1396 | 1399 | 1508 | 1539 |
| 1454 | 1432 | 1402 | 1389 | 1389 | 1271 | 1383 | 1346 | 1386 | 1519 | 1544 |

In Block S3, the phase values of the pixel points of the two-dimensional image region in the second depth image are intercepted, and the phase values of the pixel points of the non two-dimensional image region are deleted, as shown in Table 3.

In one embodiment, a method of intercepting phase values of pixel points of a two-dimensional image region in the second depth image may include:

First, searching a pixel points range of the two-dimensional image region corresponding to the testing distance in a preset database, and secondly, marking a same pixel range in the second depth image as a two-dimensional image region pixel points of the second depth image according to the pixel region range searched in the preset database. Pixel points other than the two-dimensional image region pixel points in the second depth image are marked as a non two-dimensional image region pixel points.

The preset database stores a pixel range of two-dimensional image region of a depth image at different testing distances.

For example, when the testing distance is 1.2 m, the region range of the two-dimensional image region corresponding to the testing distance of 1.2 m in the preset database is 200 pixel points×300 pixel points. The phase values of the pixel points of the two-dimensional image region are searched from a geometric center of the second depth image in upward, downward, left, and right directions according to the region range of the two-dimensional image, and the phase values of the pixel points in the non two-dimensional image region are deleted.

As shown in Table 3, because the number of pixel points in one depth image is large, for convenience of explanation, only a part of the pixel values are included in the two-dimensional image region and the non two-dimensional image region are taken as an example. The blank space in the Table 3 represents phase values of the pixel points in the non two-dimensional image region which have been deleted, that is, the two-dimensional image region is only a part of the plane where the calibration plane is located.

TABLE 3

| 1337 | 1336 | 1324 | 1233 | 1326 | 1333 | 1339 |
|------|------|------|------|------|------|------|
| 1334 | 1323 | 1328 | 1228 | 1320 | 1329 | 1338 |
| 1328 | 1321 | 1315 | 1223 | 1318 | 1322 | 1333 |
| 1307 | 1301 | 1292 | 1194 | 1293 | 1300 | 1307 |
| 1326 | 1317 | 1310 | 1211 | 1313 | 1315 | 1325 |
| 1326 | 1318 | 1313 | 1214 | 1315 | 1320 | 1328 |
| 1327 | 1326 | 1317 | 1221 | 1317 | 1325 | 1333 |

In block S4, calculating and outputting predicted phase values of pixel points in the non two-dimensional image region of the second depth image based on the phase values of pixel points of the two-dimensional image region of the second depth image and the phase values of pixel points of the first depth image.

In one embodiment, the predicted phase value of the non two-dimensional image region pixel points are calculated and outputted from the phase values of the two-dimensional image region pixel points and the phase values of the first depth image pixel point comprise:

The phase values of the pixel points corresponding to positions of the pixel points of the two-dimensional image region is searched in the first depth image.

The phase value of each pixel point at a corresponding position in the first depth image is deducted from phase value of each pixel point in the two-dimensional image region of the second depth image, and obtain a difference phase information diagram composed of the difference of the phase values. For example, the phase values in Table 3 minus the phase value of the corresponding region are shown in Table 1, and Table 4, referring to a partial difference phase information diagram composed of the difference values of the phase values is obtained.

TABLE 4

| 680 | 678 | 672 | 616 | 669 | 667 | 672 |
|-----|-----|-----|-----|-----|-----|-----|
| 680 | 672 | 677 | 612 | 665 | 670 | 675 |
| 675 | 673 | 666 | 611 | 664 | 665 | 674 |
| 672 | 666 | 662 | 602 | 656 | 658 | 663 |
| 685 | 682 | 677 | 618 | 670 | 671 | 674 |
| 683 | 680 | 679 | 618 | 672 | 674 | 679 |
| 683 | 682 | 681 | 625 | 675 | 675 | 682 |

The difference between phase values of each pixel point in the difference phase information diagram is divided by the phase value corresponding to the geometric center of the difference phase information diagram, and a ratio phase information diagram comprised of a ratio phase of each pixel point in the two-dimensional image region of the second depth image is obtained. As shown in Table 4, the phase value corresponding to the geometric center of the difference phase information diagram is 602. The phase values of other pixel points in the Table 4 are divided by the phase value 602 corresponding to the geometric center, and the ratio phase information diagram of some pixels shown in Table 5 is obtained.

TABLE 5

| 1.12957 | 1.12625 | 1.11628 | 1.02326 | 1.11129 | 1.10797 | 1.11628 |
|---------|---------|---------|---------|---------|---------|---------|
| 1.12957 | 1.11628 | 1.12459 | 1.01661 | 1.10465 | 1.11296 | 1.12126 |
| 1.12126 | 1.11794 | 1.10631 | 1.01495 | 1.10299 | 1.10465 | 1.11960 |
| 1.11628 | 1.10631 | 1.09967 | 1       | 1.08970 | 1.09302 | 1.10133 |
| 1.13787 | 1.1329  | 1.12458 | 1.02658 | 1.11296 | 1.11462 | 1.11960 |
| 1.13455 | 1.12957 | 1.12791 | 1.02658 | 1.11628 | 1.11960 | 1.12791 |
| 1.13455 | 1.13289 | 1.13123 | 1.03821 | 1.12126 | 1.12126 | 1.13289 |

Figure 4:
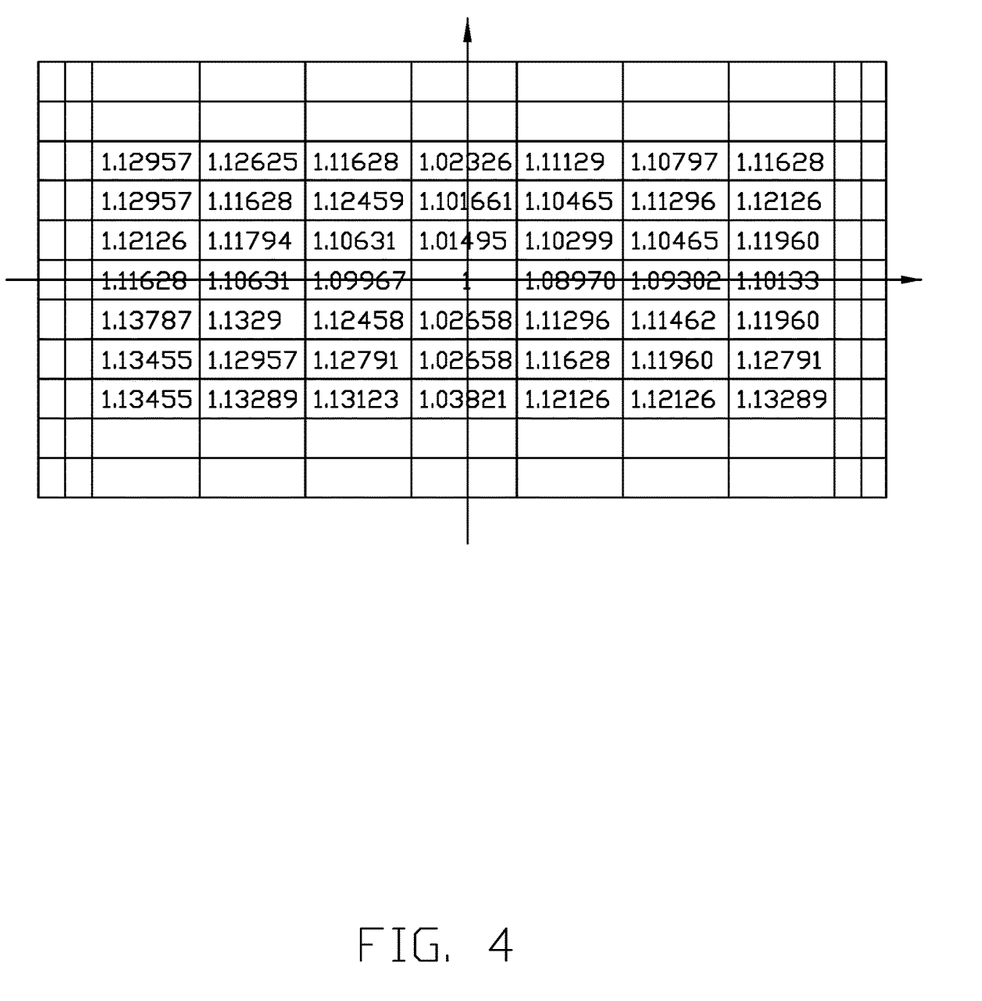
FIG. 4 is a schematic diagram of rectangular coordinates in a ratio depth information diagram for calibrating a depth of a three-dimensional camera in accordance with one embodiment.

A preset fitting algorithm is applied, according to the ratio phase value of each pixel point in the two-dimensional image region of the second depth image, for fitting the ratio phase value of each pixel point in the non two-dimensional image region of the second depth image.

Wherein the step of fitting the ratio phase value of each pixel point in the two-dimensional image region of the second depth image according to the ratio phase value of each pixel point in the non two-dimensional image region can comprise the following steps:

The pixel point located at the geometric center of the ratio phase information graph is taken as a point of origin, a two-dimensional space rectangular coordinate system is established along horizontal and vertical directions. FIG. 4 is the rectangular coordinate diagram of ratio depth information map for calibrating 3D camera depth, wherein the ratio phase value of the coordinate origin is 1.

Taken along a transverse axis direction and the vertical axis direction from the coordinate origin point of the two-dimensional rectangular coordinate system, four groups of ratio phase values of the two-dimensional image region located on the transverse coordinate axis and longitudinal coordinate axis are obtained.

The transverse axis direction and the vertical axis direction includes four directions, and the four groups of ratio phase values are {1.11628, 1.10631, 1.09967, 1}, {1, 1.08970, 1.09302, 1.10133}, {0.2326, 1.01661, 1.01495, 1}, {1, 1.02658, 1.02658, 1.03821}, respectively.

The four groups of data are selected and used a nonlinear fitting, and ratio phase values on the transverse coordinate and longitudinal coordinate position in the non two-dimensional image region are fitted. As shown in Table 6, the phase value of the pixel point of the horizontal coordinate and longitudinal coordinate of the non two-dimensional image region is fitted, and the phase value of the bold parts in Table 6 is the ratio phase value on the horizontal coordinate axis and the vertical coordinate axis.

TABLE 6

|           |           |         | 1.0943579 |         |         |         |         |         |
|-----------|-----------|---------|-----------|---------|---------|---------|---------|---------|
|           |           |         | 1.088235  |         |         |         |         |         |
|           | 1.12957   | 1.12625 | 1.11628   | 1.02326 | 1.11129 | 1.10797 | 1.11628 |         |
|           | 1.12957   | 1.11628 | 1.12459   | 1.01661 | 1.10465 | 1.11296 | 1.12126 |         |
|           | 1.12126   | 1.11794 | 1.10631   | 1.01495 | 1.10299 | 1.10465 | 1.11960 |         |
| 1.1506602 | 1.1429826 | 1.11628 | 1.10631 | 1.09967 | 1 | 1.08970 | 1.09302 | 1.10133 | 1.1741468 | 1.1826339 |

TABLE 6-continued

| | | | | | | |
|---|---|---|---|---|---|---|
| 1.13787 | 1.1329 | 1.12458 | 1.02658 | 1.11296 | 1.11462 | 1.11960 |
| 1.13455 | 1.12957 | 1.12791 | 1.02658 | 1.11628 | 1.11960 | 1.12791 |
| 1.13455 | 1.13289 | 1.13123 | 1.03821 | 1.12126 | 1.12126 | 1.13289 |
| | | | 1.0840380 | | | |
| | | | 1.0900138 | | | |

Multiplying each ratio phase value in the abscissa of the non two-dimensional image region with each ratio phase value in the longitudinal coordinate of the non two-dimensional image region to obtain a ratio phase value of the corresponding position of the non two-dimensional image region is done. The corresponding position refers to coordinate value defining by a transverse coordinate and longitudinal coordinates of the non two-dimensional image region. That is, the phase values of the thickened portion shown in Table 7 are ratio phase values of the non two-dimensional image region. The ratio phase values at a location determined by a transverse coordinate and a longitudinal coordinate of the non two-dimensional image region are obtained by multiplying the transverse coordinate with the longitudinal coordinate in Table 6. For example, in Table 7, The value locates at in line 5, column 2 is 1.16007, a ratio phase value on the abscissa of the non two-dimensional image region is 1.142983, each ratio phase value on the longitudinal coordinate of the non two-dimensional image region is 1.01495, and 1.16007=1.142983×1.01495; 1.193651=1.174147×1.016611.

The difference in phase values of each pixel point in the non two-dimensional image region is added to a specified phase value in the first depth image to obtain a predicted phase value of each pixel point in the non two-dimensional image region. The specified phase value refers to each value of a pixel point in the first depth image corresponding to each value of a pixel point at a same position of the non two-dimensional image region, and a predicted phase value of each pixel point in the non two-dimensional image region is obtained. For example, one predicted phase value in Table 7 is 1.090014, and the predicted phase value 1.090014 being multiplied by the difference phase value 602 is equal to 656.188428. A corresponding phase value of pixel point in the first depth image is 619, 619 plus 656.188428 is equal to 1275.188428. 1275.188428 is a predicted phase value of one pixel point in the non two-dimensional image region.

The predicted phase values of each pixel point in the non two-dimensional image region and the phase value of each pixel point in the two-dimensional image region are integrated and outputted. A prediction phase value of each pixel point in the non two-dimensional image region is obtained,

TABLE 7

| | | | | | | | | | | |
|---|---|---|---|---|---|---|---|---|---|---|
| 1.259234 | 1.250832 | 1.221609 | 1.210702 | 1.20345 | 1.094358 | 1.192523 | 1.196150 | 1.205248 | 1.284937 | 1.294225 |
| 1.252189 | 1.243834 | 1.214774 | 1.203928 | 1.196697 | 1.088235 | 1.185851 | 1.189466 | 1.198505 | 1.277747 | 1.286983 |
| 1.17742 | 1.169564 | 1.129568 | 1.126246 | 1.116279 | 1.023256 | 1.111296 | 1.107973 | 1.116279 | 1.201453 | 1.210137 |
| 1.169774 | 1.161969 | 1.129568 | 1.116279 | 1.124585 | 1.016611 | 1.104651 | 1.112957 | 1.121262 | 1.193651 | 1.202279 |
| 1.167863 | 1.16007 | 1.121262 | 1.11794 | 1.106312 | 1.01495 | 1.10299 | 1.104651 | 1.119601 | 1.1917 | 1.200314 |
| 1.15066 | 1.142953 | 1.116279 | 1.106312 | 1.099668 | 1 | 1.089701 | 1.093023 | 1.101329 | 1.174147 | 1.182634 |
| 1.181243 | 1.173361 | 1.137874 | 1.13289 | 1.124585 | 1.026578 | 1.112957 | 1.114618 | 1.119601 | 1.205353 | 1.214066 |
| 1.181243 | 1.173361 | 1.334551 | 1.129565 | 1.127907 | 1.026578 | 1.116279 | 1.119601 | 1.127907 | 1.205353 | 1.214066 |
| 1.194622 | 1.186651 | 1.334551 | 1.13289 | 1.131229 | 1.038206 | 1.121262 | 1.121262 | 1.13289 | 1.219606 | 1.227818 |
| 1.247539 | 1.239037 | 1.210089 | 1.199285 | 1.192081 | 1.084038 | 1.181277 | 1.184879 | 1.193882 | 1.27282 | 1.28202 |
| 1.254235 | 1.245867 | 1.21676 | 1.205896 | 1.198653 | 1.090014 | 1.18789 | 1.19141 | 1.200464 | 1.279836 | 1.289087 |

The ratio phase information of the non two-dimensional image region is inversely calculated, and predicted phase values of the non two-dimensional image region are obtained.

Wherein the ratio phase information of the non two-dimensional image region is inversely calculated, and the obtaining of the predicted phase value of the non two-dimensional image region may include the following steps:

The ratio phase value of each pixel point in the non two-dimensional image region is multiplied by the difference phase value of the geometric center of the difference phase information diagram, and difference in phase values of each pixel point in the non two-dimensional image region is obtained. For example, the phase value of each pixel point in Table 7 is multiplied by the difference phase value 602 of the geometric center of the difference phase information diagram described in Table 4, and the difference phase value of each pixel point in the non two-dimensional image region is obtained.

and the prediction phase value is stored in the second depth image according to a corresponding position of each pixel point of the non two-dimensional image region, and wherein the calibrated second depth image includes the phase values of the pixel points in the two-dimensional image region and the predicted phase values of the pixel points in the non two-dimensional image region. Furthermore, the phase value in the calibrated second depth image is used to correct the depth. Table 8 shows the phase value of some pixel points in the calibrated second depth image, wherein the calibrated second depth image includes the phase values of the pixel points in the two-dimensional image region and the predicted phase values of the pixel points in the non two-dimensional image region. The value of the black thickened parts is the predicted phase value of the pixel point in the non-two-dimensional image region, and the non-thickened number in the middle region is the phase value of the pixel point in the two-dimensional image region.

TABLE 8

| | | | | | | | | | | |
|---|---|---|---|---|---|---|---|---|---|---|
| 1532.059 | 1522.001 | 1478.409 | 1469.842 | 1458.465 | 1333.803 | 1444.899 | 1456.088 | 1466.559 | 1575.532 | 1590.123 |
| 1520.818 | 1507.788 | 1468.294 | 1457.764 | 1448.412 | 1327.117 | 1437.882 | 1445.059 | 1454.5 | 1565.204 | 1577.764 |

TABLE 8-continued

| | | | | | | | | | | |
|---|---|---|---|---|---|---|---|---|---|---|
| 1391.807 | 1383.077 | 1337 | 1336 | 1324 | 1233 | 1326 | 1333 | 1339 | 1438.274 | 1448.502 |
| 1384.204 | 1374.505 | 1334 | 1323 | 1328 | 1228 | 1320 | 1329 | 1338 | 1428.578 | 1439.772 |
| 1378.053 | 1368.362 | 1328 | 1321 | 1315 | 1223 | 1318 | 1322 | 1333 | 1428.404 | 1437.589 |
| 1347.697 | 1340.076 | 1307 | 1301 | 1292 | 1194 | 1293 | 1300 | 1307 | 1397.836 | 1406.946 |
| 1375.108 | 1364.363 | 1326 | 1317 | 1310 | 1211 | 1313 | 1315 | 1325 | 1431.623 | 1443.868 |
| 1379.108 | 1365.363 | 1326 | 1318 | 1313 | 1214 | 1315 | 1320 | 1328 | 1435.623 | 1446.868 |
| 1387.163 | 1378.364 | 1327 | 1320 | 1317 | 1221 | 1317 | 1325 | 1333 | 1447.842 | 1460.146 |
| 1461.91 | 1446.9 | 1407.474 | 1400.969 | 1390.633 | 1269.591 | 1387.129 | 1392.297 | 1402.717 | 1519.237 | 1535.776 |
| 1468.05 | 1456.012 | 1416.489 | 1405.949 | 1396.589 | 1275.188 | 1391.049 | 1399.229 | 1405.679 | 1528.461 | 1542.03 |

In block S5: calibrating the depth information of the second depth image taken by the 3D camera at a testing distance according to the predicted phase values of the pixel points in the non two-dimensional image region and the phase values of the pixel points in the two-dimensional image region.

In one embodiment, according to the predicted phase value of the pixel point of the non two-dimensional image region in the prediction second depth image and the phase value of the pixel point of the two-dimensional image region, as shown in Table 8, according to the phase value, the depth information of the image captured by the 3D camera is obtained by using the corresponding relationship between the phase value and the depth value of the 3D camera. Such corresponding relationship between the phase value and the depth value of the 3D camera is well known, the prior art is not repeated here.

Figure 5:
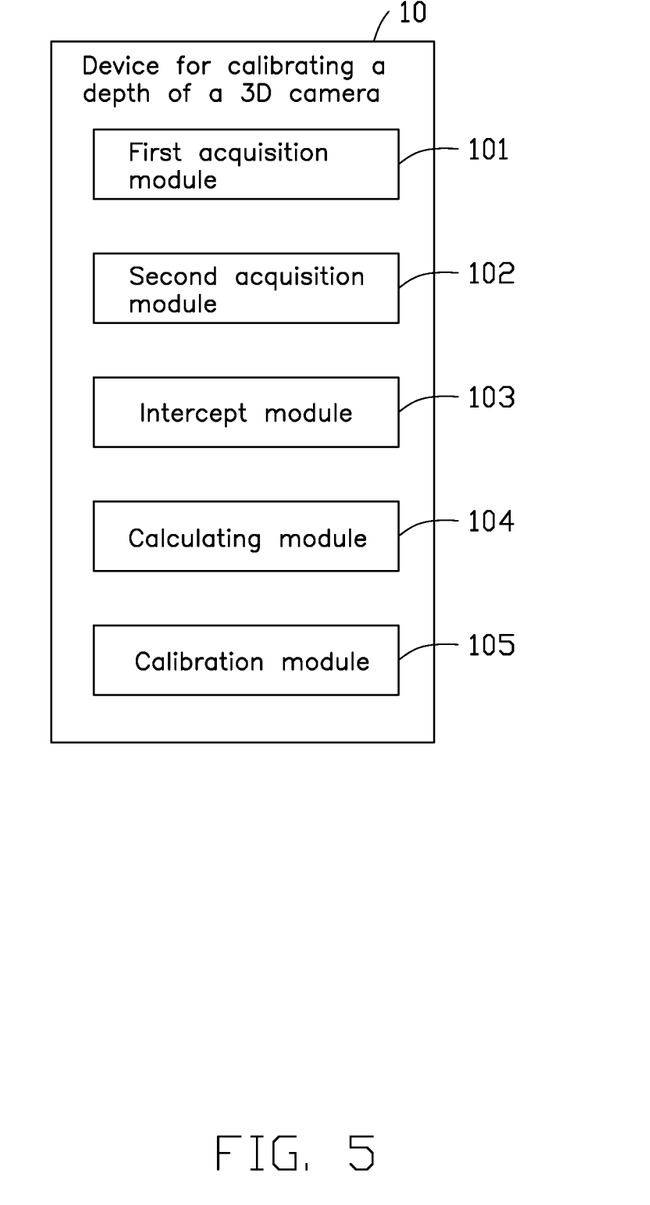
FIG. 5 is a schematic diagram of a device for calibrating a depth of a three-dimensional camera in accordance with one embodiment.
Figure 6:
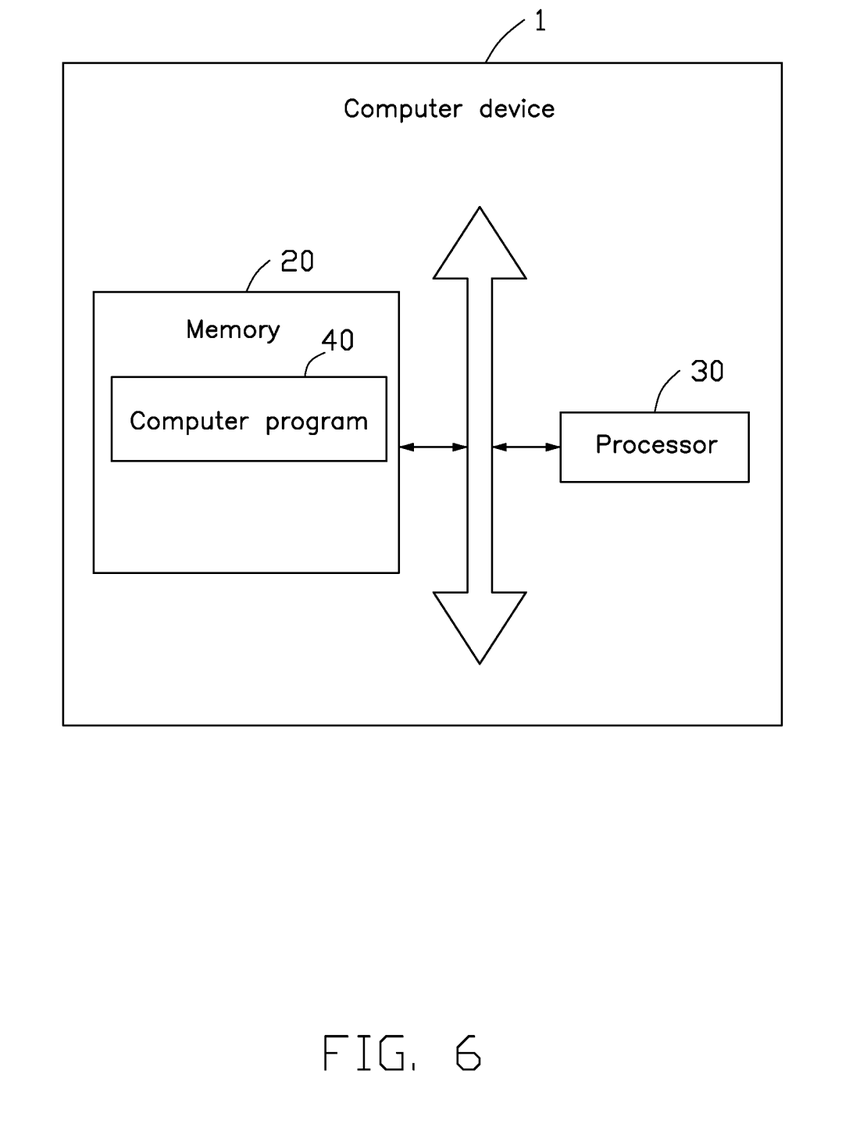
FIG. 6 is a schematic diagram of a computer device in accordance with one embodiment.

The method of calibrating 3D camera depth is introduced in detail in FIG. 3 above. The function module of the software device realizing the method of calibrating 3D camera depth and the hardware device architecture for realizing the method of calibrating 3D camera depth are introduced below combined with the 5-6 diagram. It should be understood that the embodiments are for illustrative purposes only and are not subject to this structure in the scope of patent applications.

FIG. 5 is a block diagram of a preferred embodiment of a device for calibrating the depth of a 3D camera.

In some embodiment, a device 10 for calibrating a depth of the 3D camera is run in a computer device. The computer device is connected with more than one user terminals through a network. The device 10 for calibrating the depth of the 3D camera may include functional modules comprised of a plurality of program code segments. The program code of each of the program segments in the device 10 for calibrating the depth of the 3D camera may be stored in the memory of the computer device and executed by the at least one processor to achieve the function of calibrating the depth of the 3D camera.

In the present embodiment, the device 10 for calibrating the depth of the 3D camera may be divided into functional modules in accordance with the function to be performed. Referring to FIG. 5, the functional modules may include a first acquisition module 101, a second acquisition module 102, an intercept module 103, a calculating module 104, and a calibration module 105. These modules refer to a series of computer program segments capable of being executed by at least one processor and capable of performing a fixed function, which are stored in a memory. In the present embodiment, the functions of the modules will be described in detail in the following examples.

The first acquisition module 101 is used for acquiring a first phase value of each pixel point when a distance between the 3D camera to be calibrated and the calibration plane is a standard distance, and obtaining a first depth image represented by the first phase value.

The calibration plane is a plane of uniform material or reflectivity. The standard distance is a distance between the 3D camera and the calibration plane. When a distance between the 3D camera and the calibration plane is a standard distance, the image acquired by the 3D camera only includes two-dimensional image region, and does not include a non two-dimensional image region. The non-two-dimensional region is a wall surface, a ceiling, a floor, and the like adjacent to the standard plane.

As shown in Table 1, the 3D camera acquires phase values of part of pixels in the first depth image when the distance between the 3D camera and the calibration plane is 0.6 m, and the values in the table are phase value of each pixel in the first depth image.

The second acquisition module 102 is configured for acquiring a second phase value of each pixel point when a distance between the 3D camera and the calibration plane is a testing distance, and obtaining a second depth image represented by the second phase values. The second depth image includes a two-dimensional image region and a non two-dimensional image region.

The testing distance is a distance between the 3D camera and the calibration plane. In one embodiment, the testing distance may be adjusted arbitrarily between 0.6 meters and 3.5 meters based on a shooting distance of the 3D camera to be calibrated. For the same calibration plane, when the testing distance exceeds a standard distance, the acquired second depth image will contain the two-dimensional image region of the calibration plane and other non two-dimensional image regions adjacent to the plane where the calibration plane is located, the ceiling, the ground, and other non two-dimensional things.

In one embodiment, the testing distance to be calibrated by the 3D camera is 1.2 m. When the testing distance is 1.2 m, the second depth image acquired by the 3D camera includes a two-dimensional image region of the calibration plane and other non two-dimensional image regions adjacent to the plane where the calibration plane is located, the ceiling, the ground, and other non two-dimensional image regions. The 3D camera acquires each pixel phase value in the second depth image when the distance calibration plane is 1.2 m, and the phase values of the second depth image are as shown in Table 2. And the intercepting module 103 is used for intercepting the phase value of the pixel points of the two-dimensional image region in the second depth image and deleting the phase values of the pixel point of the non two-dimensional image region. In one embodiment, a method of intercepting a phase value of a pixel of a two-dimensional in the second depth image may include: searching a pixel range of a two-dimensional image region corresponding to the testing distance in a preset database, marking the same pixel range as a two-dimensional image region pixel point in the second depth image according to the pixel range, and marking the other pixel points in the second depth image as a non two-dimensional image region pixel points. In that database, the range of the image region of the plane object in the depth image is where different testing distances are stored.

For example, when the testing distance is 1.2 m, the region range of the two-dimensional image region corresponding to the testing distance of 1.2 m in the preset database is 200 pixel points×300 pixel points. The phase values of the pixel points of the two-dimensional image region is searched from a geometric center of the second depth image in upward, downward, left, and right directions according to the region range of the two-dimensional image, and the phase values of the pixel points in the non two-dimensional image region are deleted.

As shown in Table 3, because the number of pixel points in one depth image is large, for convenience of explanation, only a part of pixel values are included in the two-dimensional image region and the non two-dimensional image region is taken as an example. The blank space in the Table 3 represents deleted phase values of the pixel points in the non two-dimensional image region, that is, the two-dimensional image region is part of plane where the calibration plane is located.

The calculation module 104 is used for calculating and outputting a predicted phase values of pixel points in the non two-dimensional image region according to the phase values of the pixel points of the two-dimensional image region and the phase values of pixel points in the first depth image.

In one embodiment, the prediction phase value of the pixel points of the non two-dimensional image region can be calculated and output according to the phase values of the pixel points of the two-dimensional image region and the phase values of the pixel points of the first depth image, and the prediction phase values of the pixel points of the non two-dimensional image region can comprise:

In the first depth image, the phase values of the pixel points corresponding to these same positions of the pixel points of the two-dimensional image in the second depth image are searched.

The phase value of each pixel point in the first depth image is subtracted from the phase value of each pixel point in the two-dimensional image region to obtain a difference phase information diagram consisting of the difference in values of the phase value, for example, the phase values in the table 3 are subtracted from the phase values of the corresponding area in the table 1. A part of the difference phase information diagram consisting of the difference of the phase values is obtained in Table 4. Dividing the difference phase values of each pixel point in the difference phase information graph by the phase values corresponding to the geometric center of the difference phase information graph, and obtain a ratio phase information diagram of the non two-dimensional image region which is composed of the ratio phase value of each pixel point of the non two-dimensional image region. The phase value corresponding to the geometric center of the difference phase information diagram shown in Table 4 is 602, and the phase values of the other pixel points in the table are divided by the phase value 602 corresponding to the geometric center to obtain a ratio phase information diagram of the part of the pixels as shown in Table 5.

According to the ratio phase value of each pixel point in the non two-dimensional image region, fitting the ratio phase value of each pixel point in the non two-dimensional image region of the second depth image is by using a preset fitting algorithm.

Wherein the step of fitting the ratio phase value of each pixel point in the non two-dimensional image region of the second depth image according to the ratio phase value of each pixel point in the non two-dimensional image region can comprise the following steps:

The pixel point at the geometric center of the ratio phase information graph is taken as the coordinates origin, a two-dimensional space rectangular coordinate system is established along horizontal and vertical directions. FIG. 4 is the rectangular coordinate diagram in the ratio depth information diagram. The ratio phase value of the coordinate origin is 1.

Taken along a transverse axis direction and the vertical axis direction from the coordinate origin point of the two-dimensional rectangular coordinate system, and obtain four groups of ratio phase values of the two-dimensional image region located on the transverse coordinate axis and longitudinal coordinate axis, the transverse axis direction and the vertical axis direction includes four directions, and the four groups of ratio phase values are {1.11628, 1.10631, 1.09967, 1}, {1, 1.08970, 1.09302, 1.10133}, {0.2326, 1.01661, 1.01495, 1}, {1, 1.02658, 1.02658, 1.03821}, respectively. The four groups of data are selected and use a nonlinear fitting, and ratio phase values on the transverse coordinate and longitudinal coordinate positions in the non two-dimensional image region are fitted. As shown in Table 6, the phase values of the pixel points of the horizontal ordinate and longitudinal coordinates of the non two-dimensional image region are fitted, and the phase values in bold in Table 6 are the ratio phase values on the horizontal coordinate axis and the vertical coordinate axis.

Multiplying each ratio phase value in the abscissa of the non two-dimensional image region with each ratio phase value in the longitudinal coordinate of the non two-dimensional image region obtains a ratio phase value of the corresponding position of the non two-dimensional image region. The corresponding position refers to coordinate values defined by a transverse coordinate and longitudinal coordinates of the non two-dimensional image region. That is, the phase values of the thickened portion shown in Table 7 are ratio phase values of the non two-dimensional image region. The ratio phase values are obtained by multiplying each ratio phase value on the abscissa in the non two-dimensional image region with each ratio phase value on the longitudinal coordinate of the non two-dimensional image regions in Table 6. For example, in Table 7, 1.16007=1.142983×1.01495; 1.193651=1.174147×1.016611.

The ratio phase information of the non two-dimensional image region is inversely calculated, and predicted phase values of the non two-dimensional image region are obtained.

Wherein the ratio phase information of the non two-dimensional image region is inversely calculated for obtaining the predicted phase value of the non two-dimensional image region, and this may include the following steps:

The ratio phase value of each pixel point in the non two-dimensional image region is multiplied by the difference phase value of the geometric center of the difference phase information diagram, and difference in phase values of each pixel point in the non two-dimensional image region is obtained. For example, the phase value of each pixel point in Table 7 is multiplied by the difference phase value 602 of the geometric center of the difference phase information diagram described in Table 4, and the difference in phase values of each pixel point in the non two-dimensional image region is obtained.

Adding the difference in phase values of each pixel point in the non two-dimensional image region and the pixel point phase value of the corresponding position of the first depth image and the non two-dimensional image region to obtain a predicted phase value of each pixel point in the non two-dimensional image region.

The predicted phase values of each pixel point in the non two-dimensional image region and the phase value of each pixel point in the two-dimensional image region are integrated and outputted. A prediction phase value of each pixel point in the non two-dimensional image region is obtained, and the prediction phase value is stored in the second depth image according to a corresponding position of each pixel point of the non two-dimensional image region, and wherein the calibrated second depth image includes the phase values of the pixel points in the two-dimensional image region and the predicted phase values of the pixel points in the non two-dimensional image region. Furthermore, the phase value in the calibrated second depth image is used to correct the depth. Table 8 shows the phase values of some pixel points in the calibrated second depth image, wherein the calibrated second depth image includes the phase values of the pixel points in the two-dimensional image region and the predicted phase values of the pixel points in the non two-dimensional image region. As shown in Table 8, the value of the black thickened part is the predicted phase values of the pixel points in the image region of the non-two-dimensional, and the unthickened number in the middle region is the phase values of the pixel points in the two-dimensional image region.

The calibration module 105 is used for calibrating the depth information of an image captured by the 3D camera according to the predicted phase values of the pixel points of the non two-dimensional image region and the phase values of the pixel points of the two-dimensional image region.

In one embodiment, according to the predicted phase values of the pixel points of the non two-dimensional image region in the second depth image and the phase values of the pixel points of the two-dimensional image region, obtaining the depth information of the 3D camera shooting image by using the corresponding relation of the 3D camera phase value and the depth value. Such corresponding relation is prior art, and the description is not repeated here.

FIG. 6 is a schematic diagram of a preferred embodiment of a computer device.

The computer device 1 includes a memory 20, a processor 30, and a computer program 40 stored in the memory 20 and capable of running on the processor 30, such as a program for calibrating depth of a 3D camera. The steps in the embodiment of the method for calibrating the depth of a 3D camera when the processor 30 executes the computer program 40, such as steps S1~S5 shown in FIG. 3. When the processor 30 executes the computer program 40, the functions of each module/unit in the device embodiment for calibrating the depth of the 3D camera, such as units 101-105 in FIG. 5, are realized.

Exemplarily, the computer program 40 may be split into one or more modules/units that are stored in the memory 20 and executed by the processor 30. The one or more modules/units may be a series of computer program instruction segments capable of performing a particular function for describing the execution process of the computer program 40 in the computer device 1. For example, the computer program 40 may be divided into a first acquisition module 101, a second acquisition module 102, an intercept module 103, a calculation module 104, and a calibration module 105 in FIG. 5.

The computer device 1 may be a computing device such as a desktop computer, a notebook, a palm computer, or a cloud server. It will be appreciated by those skilled in the art that the schematic is merely an example of a computer device 1 and does not constitute a limitation to the computer device 1, which may include more or fewer components than illustrated, or have only some components, or have different components, For example, the computer device 1 may also include an input/output device, a network access device, a bus, and the like.

The processor 30 may be a Central Processing Unit (CPU), or other general purpose processor, Digital Signal Processor (DSP), Application Specific Integrated Circuit (ASIC), an off-the-shelf programmable gate array (Field-Programmable Gate Array), or other programmable logic devices, discrete gates, or transistor logic devices, discrete hardware components, and the like. The general purpose processor may be a microprocessor or the processor 30, or may also be any conventional processor or the like. The processor 30 is the control center of the computer device 1, and uses various interfaces and lines to connect the various parts of the entire computer device 1.

The memory 20 may be used to store the computer program 40 and/or module/unit, and the processor 30 is configured to performs various functions of the computer device 1 by running or executing computer programs and/or modules/units stored in the memory 20, and invoking data stored in the memory 20. The memory 20 may mainly include a storage program area and a storage data area. Wherein the stored program area can store an operating system, at least one application program (such as sound playing function, image playing function, etc.) required by the function. The storage data area may store data (e.g., audio data, telephone books, etc.) created according to the use of the computer apparatus 1. In addition, the memory 20 may include high-speed random access memory, and may include non-volatile memory, such as a hard disk, a memory, a plug-in hard disk, a Smart Media Card (SMC), a Secure Digital (SD) card, a Flash Card, at least one disk memory device, a flash memory device, or other volatile solid-state memory device.

If the integrated module/unit of the computer device 1 is implemented as a software functional unit and sold or used as a separate product, it can be stored in a computer readable storage medium. On the basis of such understanding, the present disclosure realizes all or part of the flow of the above-mentioned embodiment method, and can also be completed through a computer program to instruct related hardware, the computer program can be stored in a computer-readable storage medium, and the computer program can realize the Blocks of the above various method embodiments when executed by the processor. The computer program may comprise a computer program code that may be in source code form, object code form, executable file, or some intermediate form. The computer readable medium may include:

Any entity or device capable of carrying the computer program code, a recording medium, a USB disk, a mobile hard disk, a disk, an optical disk, a computer memory, a read-only memory (ROM), a random access memory (RAM, Random Access Memory), an electric carrier signal, a telecommunication signal, and a software distribution medium. It should be noted that the content contained in the computer-readable medium may be appropriately increased or decreased in accordance with legislation and patent practice in the jurisdiction, for example, in certain jurisdictions, in accordance with legislation and patent practice, the computer-readable medium is deemed not to include electric carrier signals and telecommunication signals. In several embodiments provided by the present disclosure, it should be understood that the disclosed computer apparatus and method may be implemented by other means. For example, the above described computer device embodiment is merely schematic, for example, the division of the unit is only a logical function division, and the actual implementation may have an additional division mode. In addition, the functional units in various embodiments may be integrated in the same processing unit, each unit may be physically present alone, or two or more units may be integrated in the same unit. The above integrated units can be realized in the form of hardware or in the form of hardware plus software function module.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore, be appreciated that the embodiments described above may be modified within the scope of the claims.

What is claimed is:

1. A method for calibrating a depth of a 3D camera comprising:
    selecting a calibration plane and obtaining a first depth image of the calibration plane using a 3D camera when a distance between the 3D camera and a calibration plane is a standard distance, and the first depth image represented by a first phase values of pixel points;
    obtaining a second depth image of the calibration plane using the 3D camera when a distance between the 3D camera and the calibration plane is a testing distance, and the first depth image represented by a second phase values of pixel points, the second depth image includes a two-dimensional image region and a non two-dimensional image region;
    intercepting the phase values of the pixel points of the two-dimensional image region and deleting the phase values of the pixel points of the non two-dimensional image region in the second depth image;
    calculating and outputting predicted phase values of pixel points in the non two-dimensional image region of the second depth image based on the phase values of pixel points in the two-dimensional image region of the second depth image and the phase values of pixel points of the first depth image; and
    calibrating the second depth image according to the predicted phase values of the pixel points in the non two-dimensional image region and the phase values of the pixel points in the two-dimensional image region of the second depth image.

2. The method of claim 1, wherein a method of intercepting phase values of pixel points of a two-dimensional image region in the second depth image comprising:
    searching a pixel point range of a two-dimensional image region corresponding to the testing distance in a preset database;
    marking a same pixel point range in the second depth image as the two-dimensional image region pixel points of the second depth image according to the pixel region range searched in the preset database, and
    marking the pixel points other than the two-dimensional image region pixel points in the second depth image as a non two-dimensional image region pixel points; and
    wherein the preset database stores a pixel range of two-dimensional image region of a depth image at different testing distances.

3. The method of claim 2, wherein a method for calculating and outputting the predicted phase value of the pixel points in the non two-dimensional image region according to the phase value of the two-dimensional image region pixel point and the phase value of the first depth image pixel point comprise:
    searching phase values of the pixel points corresponding to positions of the pixel points of the two-dimensional image region of the second depth image in the first depth image;
    subtracting the phase value of each pixel point at a corresponding position of the first depth image from phase value of each pixel point in the two-dimensional image region of the second depth image and obtaining a difference phase information diagram composed of the difference of the phase values;
    the difference phase value of each pixel point in the difference phase information diagram is divided by the phase value corresponding to a geometric center of the difference phase information diagram, and obtaining a ratio phase information diagram comprised of a ratio phase of each pixel point in the two-dimensional image region of the second depth image;
    fitting the ratio phase value of each pixel point in the non two-dimensional image region of the second depth image by using a preset fitting algorithm according to the ratio phase value of each pixel point in the two-dimensional image region of the second depth image;
    inversely calculating the ratio phase information of the non two-dimensional image region, and obtaining predicted phase values of the non two-dimensional image region; and
    integrated and outputting predicted phase values of each pixel point in the non two-dimensional image region and the phase value of each pixel point in the two-dimensional image region.

4. The method of claim 3, wherein a method for fitting the ratio phase value of each pixel point in the non two-dimensional image region of the second depth image by using a preset fitting algorithm according to the ratio phase value of each pixel point in the two-dimensional image region of the second depth image comprising:
    taking the pixel point locating at the geometric center of the ratio phase information graph as a coordinate origin point, establishing a two-dimensional rectangular coordinate system along horizontal and vertical directions, and the ratio phase value of the coordinate origin is 1;
    taking along a transverse axis direction and the vertical axis direction from the coordinate origin point of the two-dimensional rectangular coordinate system, and obtaining four groups of ratio phase values in the two-dimensional image region located on the transverse coordinate axis and the longitudinal coordinate axis;
    fitting ratio phase values on the transverse coordinate and longitudinal coordinate position of the two-dimensional image region according the four groups data by using a nonlinear fitting, and obtaining a ratio phase value of a corresponding position of the non two-dimensional image region by multiplying each ratio phase value on the abscissa axis of the non two-dimensional image region with each ratio phase value on the longitudinal coordinate axis of the non two-dimensional image region.

5. The method of claim 3, wherein a method for inversely calculating the ratio phase information of the non two-dimensional image region, and obtaining predicted phase values of the non two-dimensional image region comprising:

multiplying the ratio phase value of each pixel point in the non two-dimensional image region by the difference phase value locating at the geometric center of the difference phase information diagram, and obtaining difference phase values of each pixel point in the non two-dimensional image region; and obtaining a predicted phase value of each pixel point in the non two-dimensional image region by adding a specified difference phase value of each pixel point in the non two-dimensional image region to a specified phase value in the first depth image.

6. The method of claim 5, wherein the specified phase value refers to each value of a pixel point in the first depth image corresponding to each value of a pixel point at a same position of the non two-dimensional image region.

7. The method of claim 3, wherein a method for integrated and outputting predicted phase values of each pixel point in the non two-dimensional image region and the phase value of each pixel point in the two-dimensional image region comprising:

obtaining a prediction phase value of each pixel point in the non two-dimensional image region; and storing the prediction phase value in the second depth image according to a corresponding position of each pixel point of the non two-dimensional image region, respectively, and wherein the calibrated second depth image comprises the phase values of the pixel points in the two-dimensional image region and the predicted phase values of the pixel points in the non two-dimensional image region; and the phase values in the calibrated second depth image is used to correct the depth.

8. A device for calibrating a depth of a 3D camera comprising:

a first acquisition module configured to obtain a first depth image of the calibration plane using a 3D camera when a distance between the 3D camera and a calibration plane is a standard distance, and the first depth image represented by a first phase values of pixel points;

a second acquisition module configured to obtain a second depth image of the calibration plane using the 3D camera when a distance between the 3D camera and the calibration plane is a testing distance, and the first depth image represented by a second phase values of pixel points, the second depth image includes a two-dimensional image region and a non two-dimensional image region;

an intercept module configured to intercept the phase values of the pixel points of the two-dimensional image region and deleting the phase values of the pixel points of the non two-dimensional image region in the second depth image;

a calculating module configured to calculate and output predicted phase values of pixel points in the non two-dimensional image region of the second depth image based on the phase values of pixel points in the two-dimensional image region of the second depth image and the phase values of pixel points of the first depth image; and a calibration module configured to calibrating the second depth image according to the predicted phase values of the pixel points in the non two-dimensional image region and the phase values of the pixel points in the two-dimensional image region of the second depth image.

9. A computer device, comprising:

a memory for storing a computer program;

and a processor telecommunications with the memory, wherein the processor is able to execute the computer program, and the computer program is configured to carry out a method for calibrating a depth of a 3D camera, and wherein the method comprising:

selecting a calibration plane and obtaining a first depth image of the calibration plane using a 3D camera when a distance between the 3D camera and a calibration plane is a standard distance, and the first depth image represented by a first phase values of pixel points;

obtaining a second depth image of the calibration plane using the 3D camera when a distance between the 3D camera and the calibration plane is a testing distance, and the first depth image represented by a second phase values of pixel points, the second depth image includes a two-dimensional image region and a non two-dimensional image region;

intercepting the phase values of the pixel points of the two-dimensional image region and deleting the phase values of the pixel points of the non two-dimensional image region in the second depth image;

calculating and outputting predicted phase values of pixel points in the non two-dimensional image region of the second depth image based on the phase values of pixel points in the two-dimensional image region of the second depth image and the phase values of pixel points of the first depth image; and calibrating the second depth image according to the predicted phase values of the pixel points in the non two-dimensional image region and the phase values of the pixel points in the two-dimensional image region of the second depth image.

10. The computer device of claim 9, wherein the computer program further comprising:

a first acquisition module for acquiring a first phase value of each pixel point when a distance between the 3D camera to be calibrated and the calibration plane is a standard distance;

a second acquisition module for acquiring a second phase value of each pixel point when a distance between the 3D camera and the calibration plane is a testing distance, and obtaining a second depth image represented by the second phase values;

an intercepting module for intercepting the phase value of the pixel points of the two-dimensional image region in the second depth image and deleting the phase values of the pixel point of the non two-dimensional image region;

a calculation module for calculating and outputting a predicted phase values of pixel points in the non two-dimensional image region according to the phase values of the pixel points of the two-dimensional image region and the phase values of pixel points in the first depth image; and a calibration module used for calibrating the depth information of an image captured by the 3D camera according to the predicted phase values of the pixel points of the non two-dimensional image region and the phase values of the pixel points of the two-dimensional image region.

* * * * *